US012424189B2

(12) United States Patent
Chang et al.

(10) Patent No.: US 12,424,189 B2
(45) Date of Patent: Sep. 23, 2025

(54) DISPLAY DEVICE

(71) Applicant: GIGA-BYTE TECHNOLOGY CO., LTD., New Taipei (TW)

(72) Inventors: Kuei-Shan Chang, New Taipei (TW); Shih-Chieh Chou, New Taipei (TW); Bo Yang, New Taipei (TW); Shengchun Ding, New Taipei (TW); Lin Li, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/763,713

(22) Filed: Jul. 3, 2024

(65) Prior Publication Data

US 2025/0104666 A1 Mar. 27, 2025

(30) Foreign Application Priority Data

Sep. 27, 2023 (TW) ................................ 112137007

(51) Int. Cl.
*G06F 13/12* (2006.01)
*G09G 5/00* (2006.01)

(52) U.S. Cl.
CPC ......... *G09G 5/006* (2013.01); *G09G 2370/24* (2013.01)

(58) Field of Classification Search
None
See application file for complete search history.

(56) References Cited

U.S. PATENT DOCUMENTS

2013/0050084 A1* 2/2013 Soffer ..................... G06F 3/023 345/163
2016/0117276 A1* 4/2016 Park ...................... G06F 13/385 710/63

FOREIGN PATENT DOCUMENTS

CN 113672535 A * 11/2021 ......... G06F 13/4282
CN 113110812 B 8/2023
KR 10-2254873 B1 5/2021
(Continued)

OTHER PUBLICATIONS

Method Switching (translated version) (Year: 2021).*
(Continued)

*Primary Examiner* — Henry Tsai
*Assistant Examiner* — Dean Phan
(74) *Attorney, Agent, or Firm* — Birch, Stewart, Kolasch & Birch, LLP

(57) ABSTRACT

A display device includes a button, a first data transmission port, a second data transmission port, a first image transmission port, a second image transmission port, and a microcontroller. The first data transmission port is coupled to a first electronic device. The second data transmission port is coupled to a second electronic device. The first image transmission port is coupled to the first electronic device. The second image transmission port is coupled to the second electronic device. The microcontroller selects the first image transmission port, the second image transmission port, or both to generate a video signal. When the button is pressed, if the microcontroller selects the first image transmission port, the microcontroller switches the first data transmission port to the second data transmission port, and receives image-transmission-port information stored in the second electronic device through the second data transmission port.

10 Claims, 5 Drawing Sheets

(56) References Cited

FOREIGN PATENT DOCUMENTS

| | | | |
|---|---|---|---|
| TW | 201015383 | A | 4/2010 |
| TW | 201117013 | A | 5/2011 |
| TW | 201245964 | A | 11/2012 |
| TW | 202314521 | A | 4/2023 |

OTHER PUBLICATIONS

Method Switching (Year: 2021).*

Office Action issued in Taiwan Patent Application No. 112137007 dated Mar. 27, 2024.

Extended European Search Report for European Application No. 24192068.5, dated Jan. 23, 2025.

* cited by examiner

DISPLAY DEVICE

CROSS REFERENCE TO RELATED APPLICATIONS

This Application claims priority of Taiwan Patent Application No. 112137007, filed on Sep. 27, 2023, the entirety of which is incorporated by reference herein.

BACKGROUND OF THE INVENTION

Field of the Invention

The present invention relates to an electronic device, and, in particular, to a display device with a KVM automatic binding function.

Description of the Related Art

The KVM setting of traditional monitors requires the user to manually set the image input source to be bound to a Type-B universal serial bus (USB) or upstream USB in the on-screen menu (OSD) or application program (AP), depending on the wiring method.

BRIEF SUMMARY OF THE INVENTION

An embodiment of the present invention provides a display device. The display device includes a button, a first data transmission port, a second data transmission port, a first image transmission port, a second image transmission port, a microcontroller, and a display module. The first data transmission port is coupled to a first electronic device. The second data transmission port is coupled to a second electronic device. The first image transmission port is coupled to the first electronic device. The second image transmission port is coupled to the second electronic device. The microcontroller selects the first image transmission port, the second image transmission port, or both to generate a video signal. The display module presents an image according to the video signal. When the button is pressed, if the microcontroller selects the first image transmission port, the microcontroller switches the first data transmission port to the second data transmission port, and receives image-transmission-port information stored in the second electronic device through the second data transmission port.

According to the display device described above, the image-transmission-port information corresponds to the second image transmission port, records that the second data transmission port corresponds to the second image transmission port, and is stored in a pairing table of the microcontroller. The microcontroller selects the second image transmission port.

According to the display device described above, the image-transmission-port information corresponds to the second image transmission port, records that the second data transmission port corresponds to the second image transmission port, and is stored in a pairing table of the microcontroller. The microcontroller switches the second data transmission port to the first data transmission port.

The display device further includes a peripheral connection port. The peripheral connection port is electrically connected to the first data transmission port or the second data transmission port.

According to the display device described above, a first application installed on the first electronic device stores the image-transmission-port information from the first electronic device. A second application installed on the second electronic device stores the image-transmission-port information from the second electronic device.

According to the display device described above, when the button is pressed for a period longer than or equal to a preset period, the image-transmission-port information corresponds to the second image transmission port, records that the second data transmission port corresponds to the second image transmission port, and is stored in a pairing table of the microcontroller. The microcontroller switches the second data transmission port to the first data transmission port.

According to the display device described above, the preset period is 3 seconds.

According to the display device described above, the first data transmission port and the first image transmission port are coupled to the first electronic device through the same transmission line.

According to the display device described above, when the button is pressed for a period shorter than the preset period, the microcontroller switches the first data transmission port to the second data transmission port and switches the first image transmission port to the second image transmission port according to the pairing table and the first image transmission port which is currently selected.

According to the display device described above, when the pairing table has recorded that the first data transmission port corresponds to the first image transmission port and the button is pressed for a period shorter than the preset period, the microcontroller switches the second data transmission port to the first data transmission port and switches the second image transmission port to the first image transmission port according to the pairing table and the second image transmission port which is currently selected.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
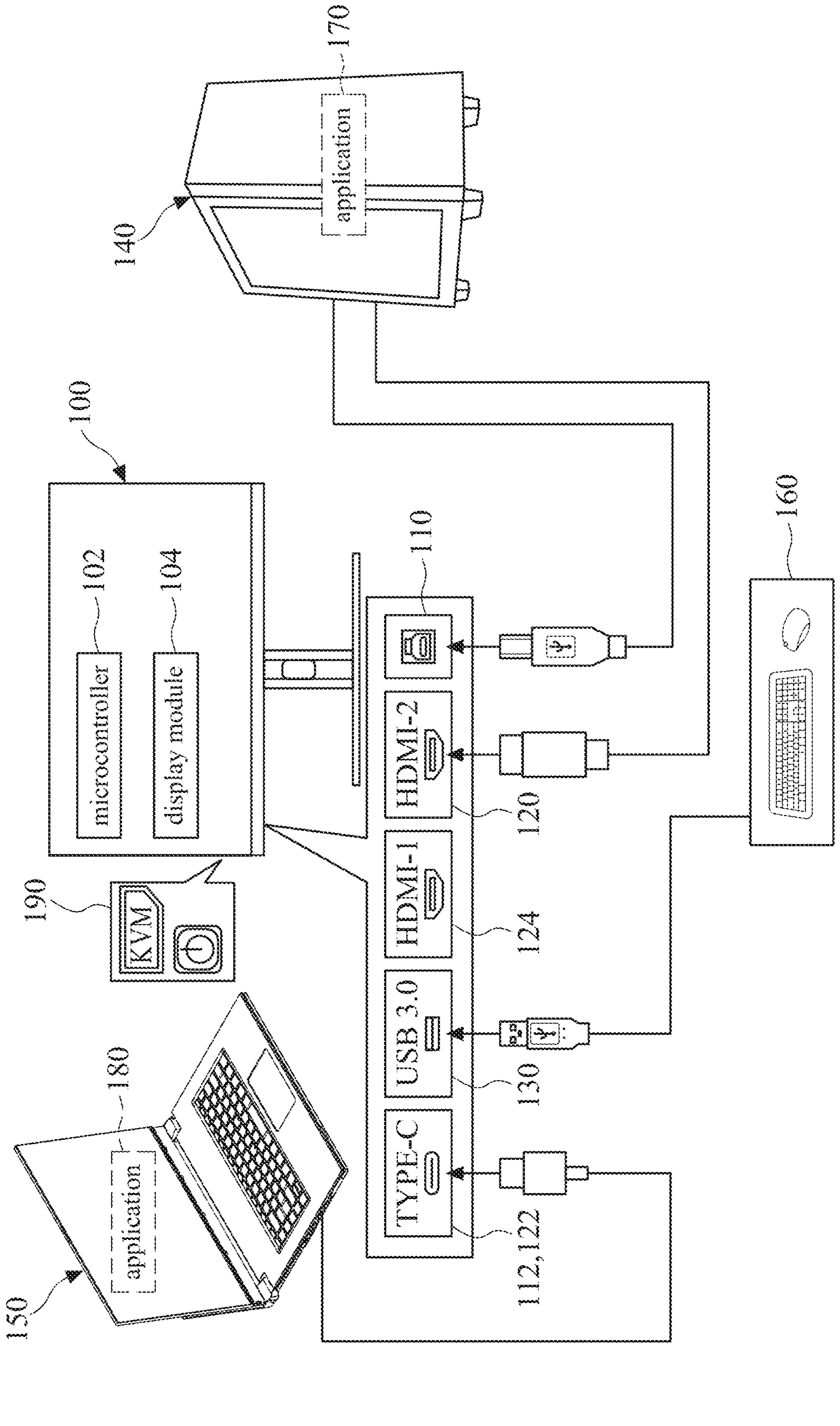
FIG. 1 shows a configuration diagram of a display device 100, an electronic device 140, and an electronic device 150 in accordance with some embodiments of the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" or "include" used in the present invention are used to indicate the existence of specific technical features, values, method steps, operations, units or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, or materials used in specific embodiments. However, the drawings should not be construed as defining or limiting the scope or properties encompassed by these embodiments. For example, for clarity, the relative size, thickness, and position of each layer, each area, or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without depart in from the spirit of the present invention.

FIG. 1 shows a configuration diagram of a display device 100, an electronic device 140, and an electronic device 150 in accordance with some embodiments of the present invention. As shown in FIG. 1, the display device 100 includes a microcontroller 102, a display module 104, a data transmission port 110, a data transmission port 112, an image transmission port 120, an image transmission port 122, an image transmission port 124, a peripheral connection port 130, and a button 190. The data transmission port 110 is coupled to the electronic device 140. The data transmission port 112 and the image transmission port 122 are coupled to the electronic device 150 through the same transmission line. The image transmission port 120 is coupled to the electronic device 140. Inside the display device 100, the peripheral connection port 130 is electrically connected to the data transmission port 110 or the data transmission port 112. Outside the display device 100, the peripheral connection port 130 is coupled to a peripheral device 160.

In some embodiments, the data transmission port 110 is a Type-B universal serial bus (USB). In some embodiments, the data transmission port 110 may be other data transmission interfaces. The image transmission port 120 and the image transmission port 124 are High Definition Multimedia Interfaces (HDMI). The image transmission port 120 is marked as HDMI-2 in the display device 100 and the image transmission port 124 is marked as HDMI-1 in the display device 100, but the present invention is not limited thereto. In some embodiments, the image transmission ports 120 and 124 may be, for example, a DisplayPort (DP) interface, an embedded DisplayPort (eDP), a low voltage differential signaling (LVDS) interface, a universal serial bus (USB) interface, an USB Type-C interface, a Thunderbolt interface, a Digital Video Interface (DVI), a Video Graphics Array (VGA) interface, etc., or a combination thereof. In some embodiments, the electronic device 140 is a laptop, but the present invention is not limited thereto. In some embodiments, the button 190 is a KVM button. In some embodiments, the button 190 may be, for example, a touch panel, a sensor, etc., but the present invention is not limited thereto. In some embodiments, the image transmission port 124 is not coupled to any device, but the present invention is not limited thereto.

In some embodiments, the data transmission port 112 and the image transmission port 122 are coupled to the electronic device 150 through the same Type-C USB transmission line, but the present invention is not limited thereto. The electronic device 150 is a laptop, but the present invention is not limited thereto. In some embodiments, the electronic device 150 may be, for example, a smartphone, a tablet, etc. The peripheral connection port 130 is a Universal Serial Bus 3.0, that is, USB 3.0, but the present invention is not limited thereto. In some embodiments, the peripheral connection port 130 may be, for example, other types of Universal Serial Bus, or other data transmission interfaces such as SATA and RS232. The peripheral device 160 may be, for example, a keyboard, a mouse, a printer, or some other common peripheral devices. The microcontroller 102 selects at least one of the image transmission ports 120 or 122 to generate a video signal. Then, the display module 104 presents an image according to the video signal.

In some embodiments, the microcontroller 102 selects the image transmission port 122, the display module 104 initially displays the image from the electronic device 150, and the peripheral device 160 is connected to the electronic device 150. That is, the display device 100 initially displays the image from the laptop, and the pairing table of the display device 100 has not yet stored the information of "data transmission port 110 corresponding to image transmission port 120". When the button 190 is pressed, the microcontroller 102 switches from data transmission port 112 to data transmission port 110, receives image-transmission-port information stored in the electronic device 140 through data transmission port 110, and the image-transmission-port information is stored in a pairing table of the microcontroller 102. The image-transmission-port information of the electronic device 140 is related to that the data transmission port 110 corresponds to the image transmission port 120. The system of the electronic device 140 is installed with an application 170. When the application 170 is executed, the application 170 may store the current image-transmission-port information related to the electronic device 140. The application 170 can be used to update the information that "the data transmission port 110 corresponds to image transmission port 120" into the pairing table. After the application 170 of the electronic device 140 completes the update of the pairing table, the microcontroller 102 of the display device 100 selects the image transmission port 120 to generate a video signal, so that the display module 104 displays an image according to the video signal. At this time, the display device 100 displays the image from the laptop, and the peripheral device 160 is connected to the laptop.

In the above embodiment, after the pairing table is updated, it is switched to the laptop. In other embodiments, after the application 170 of the electronic device 140 completes the update of the pairing table, the microcontroller 102 of the display device 100 may switch the data transmission port 110 back to the data transmission port 112, and the peripheral device 160 is connected to the laptop. The microcontroller 102 originally selects the image transmission port 122, so the display device 100 still displays the image from the laptop.

The application 180 installed on the electronic device 150 stores the image-transmission-port information from the electronic device 150. The application 180 can be used to update the information that "the data transmission port 112 corresponds to the image transmission port 122" into the pairing table. The difference between the application 180 and the application 170 is that the application program 180 is installed in the electronic device 150 (such as a laptop), while the application 170 is installed in the electronic device 140 (such as a desktop computer).

In some embodiments, in order to facilitate the user's operation, the above action will only be performed when the button 190 is pressed for a period longer than or equal to a preset period (for example, 3 seconds). After switching the data transmission port and updating the video connection status of the desktop computer, the display device chooses to display the image from the laptop or from the desktop computer. When the button 190 is pressed for a period shorter than the preset period (for example, 3 seconds), the microcontroller 102 directly switches between the laptop and the desktop computer. That is, the microcontroller 102 switches according to the information that "the data transmission port 112 corresponds to the image transmission port 122" and "the data transmission port 110 corresponds to image transmission port 120" recorded in the pairing table. The period the button 190 is pressed and the action after the button 190 is pressed can be set according to different requirements.

In some embodiments, in the first scenario, the display device 100 initially displays the image from the electronic device 150, and the peripheral device 160 is initially connected to the electronic device 150 through the peripheral connection port 130 and the data transmission port 112. In other words, in the first scenario, the display device 100 initially displays the image from the electronic device 150 (for example, a laptop), and the peripheral device 160 is connected to the electronic device 150. When the button 190 is pressed, the microcontroller 102 of the display device 100 reads the data-transmission-port status of the electronic device 150. That is, the microcontroller 102 can know that the data transmission port that is currently connected is the data transmission port 112. Then, the microcontroller 102 switches data transmission ports. That is, the microcontroller 102 switches from data transmission port 112 to data transmission port 110. Afterwards, the microcontroller 102 delays for 3 seconds to wait for its pairing table to be updated by the application 170 of the electronic device 140. Then, the microcontroller 102 switches image transmission ports according to the pairing table. That is, the microcontroller 102 switches from image transmission port 122 to image transmission port 120 according to the pairing table, so that the display module 104 of the display device 100 can display the image from the electronic device 140.

The above steps of waiting for the pairing table to be updated by the application 170 of the electronic device 140 are shown below. The electronic device 140 pre-installs and executes the application 170. The application 170 is used to obtain the upstream data-transmission-port information. For example, the application 170 obtains the information that the microcontroller 102 is connected to the data transmission port 110. If the application 170 cannot obtain any upstream data-transmission-port information, the application 170 repeatedly detects until it obtains the upstream data-transmission-port information. After the application 170 obtains the image-transmission-port information from the electronic device 140, the application 170 has obtained the information that "the data transmission port 110 corresponds to the image transmission port 120".

If the information that "data transmission port 110 corresponds to the image transmission port 120" which is known by the application 170 is not recorded in the pairing table, the application 170 determines that the information it has known is different from the information stored in the pairing table. Then the application 170 may store (or update) the information that "the data transmission port 110 corresponds to the image transmission port 120" in the pairing table, so that the microcontroller 102 can subsequently read the updated pairing table. If the application 170 fails to update the KVM pairing table, the application 170 may detect repeatedly to obtain the upstream data-transmission-port information.

Figure 2:
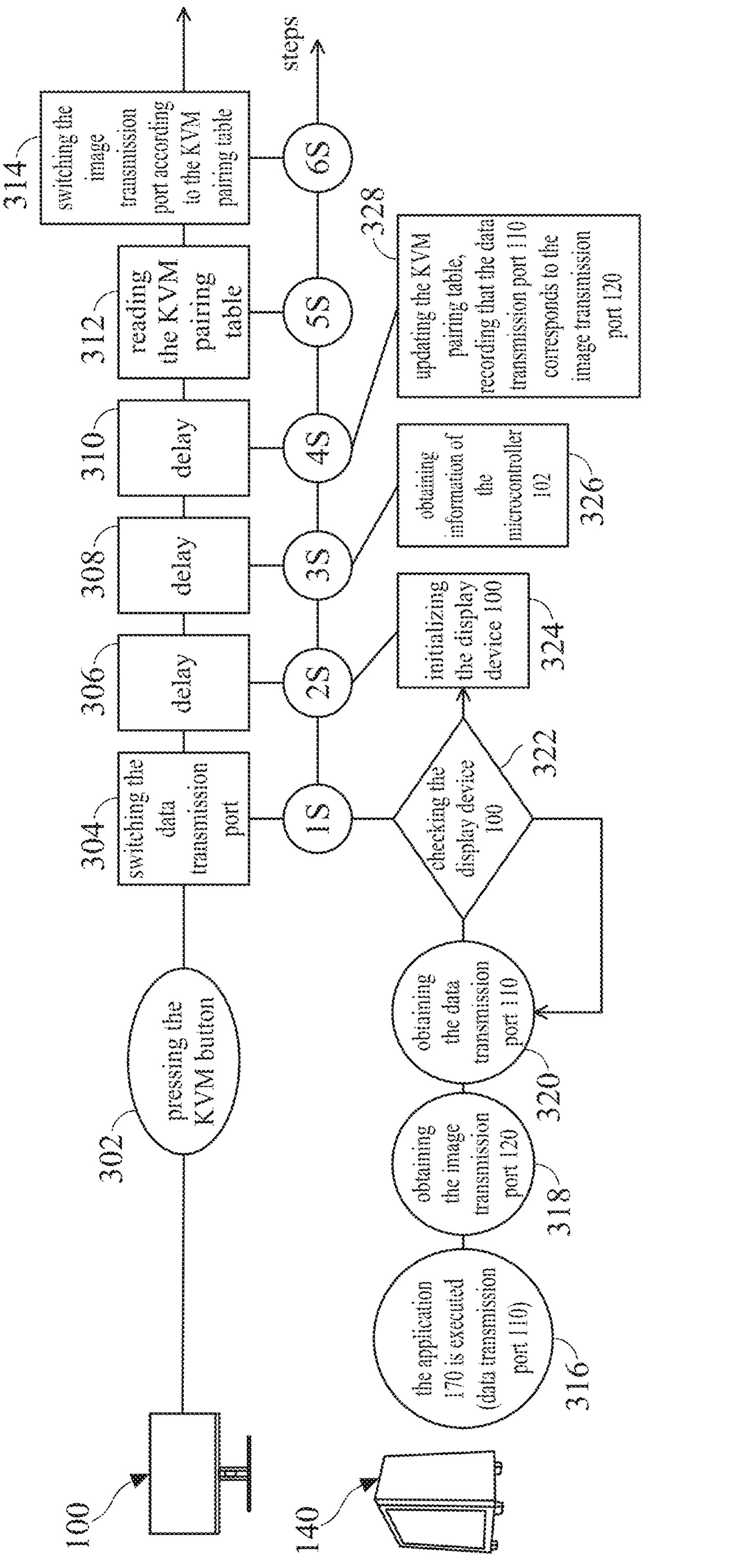
FIG. 2 shows an operation sequence diagram of the display device 100 and the electronic device 140 in FIG. 1 in a first scenario in accordance with some embodiments of the present invention.

FIG. 2 shows an operation sequence diagram of the display device 100 and the electronic device 140 in FIG. 1 in a first scenario in accordance with some embodiments of the present invention. In some embodiments of FIG. 2, the display device 100 initially displays the image from the electronic device 150, and the peripheral device 160 is initially connected to the electronic device 150 through the peripheral connection port 130 and the data transmission port 112. As shown in FIG. 2, when the button 190 (for example, a KVM button) is pressed (block 302), in the first step (1S), the microcontroller 102 of the display device 100 switches data transmission ports (block 304). That is, the microcontroller 102 switches from data transmission port 112 to data transmission port 110. Before the first step (1S), the electronic device 140 executes the application 170 (block 316). The application 170 may obtain the image transmission port 120 to which the electronic device 140 is connected (block 318) and the data transmission port 110 to which the electronic device 140 is connected (block 320). Then, in the first step (1S), the application 170 checks the display device 100 (block 322). For example, the application 170 can check the settings of relevant connection parameters between the electronic device 140 and the display device 100, but the present invention is not limited thereto. In some embodiments, if the application 170 detects an error in the connection with the display device 100, the application 170 may re-confirm the data transmission port to which the electronic device 140 is connected.

In the second step (2S), the microcontroller 102 of the display device 100 performs the delay action (block 306). In the second step (2S), the application 170 executed by the electronic device 140 initializes the display device 100 (block 324). In the third step (3S), the application 170 executed by the electronic device 140 obtains the information of the microcontroller 102 (block 326). For example, the application 170 obtains the information of the pairing table in the microcontroller 102. In the fourth step (4S), the microcontroller 102 of the display device 100 performs a delay action (block 310). In the fourth step (4S), the application 170 executed by the electronic device 140 updates the KVM pairing table and records (or stores) the information that "the data transmission port 110 corresponds to the image transmission port 120" in the KVM pairing table (block 328).

In the fifth step (5S), the microcontroller 102 of the display device 100 reads the KVM pairing table (block 312). In some embodiments, the KVM pairing table has been updated by the application 170 executed by the electronic device 140. In the sixth step (6S), the microcontroller 102 of the display device 100 switches image transmission ports according to the KVM pairing table (block 314). That is, the microcontroller 102 switches from image transmission port 122 to image transmission port 120, so that the control rights of the keyboard and mouse in the peripheral device 160 and the image displayed by the display module 104 in the display device 100 are switched to the electronic device 140. The time units of the steps in FIG. 2 (for example, the interval between each step is 1 second) are only examples, expressing the approximate sequence of corresponding actions performed between the display device 100 and the electronic device 140, and are not intended to limit the present invention.

Figure 3:
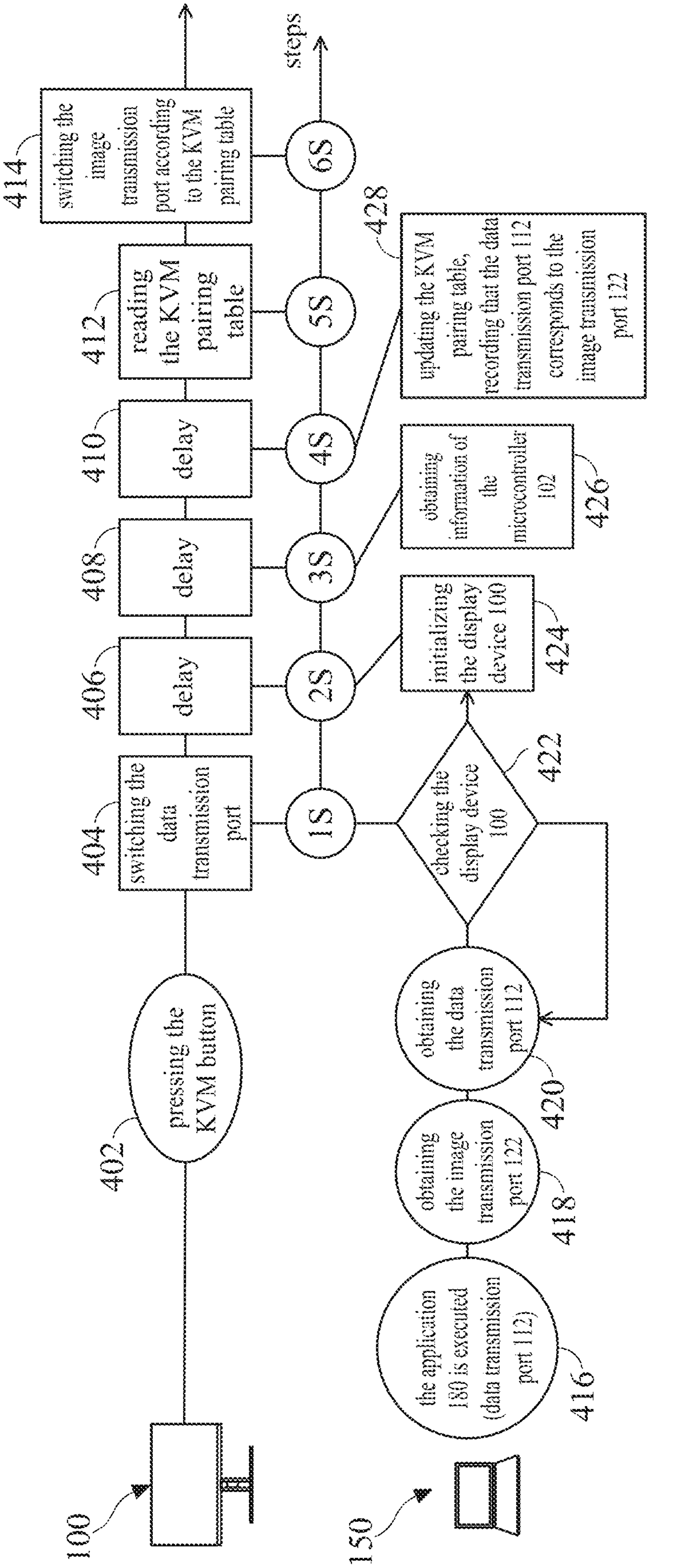
FIG. 3 shows an operation sequence diagram of the display device 100 and the electronic device 150 in FIG. 1 in a second scenario in accordance with some embodiments of the present invention.

FIG. 3 shows an operation sequence diagram of the display device 100 and the electronic device 150 in FIG. 1 in a second scenario in accordance with some embodiments of the present invention. In the second scenario of some embodiments in FIG. 3, the display device 100 initially displays the image from the electronic device 140, and the peripheral device 160 is initially connected to the electronic device 140 through the peripheral connection port 130 and the data transmission port 110. In other words, in the second scenario, the display device 100 initially displays the image from the electronic device 140 (such as a desktop computer), and the peripheral device 160 is connected to the electronic device 140. As shown in FIG. 3, when the button 190 (for example, the KVM button) is pressed (block 402), in the first step (1S), the microcontroller 102 of the display device 100 switches data transmission ports (block 404). That is, the microcontroller 102 switches from data transmission port 110 to data transmission port 112. Before the first step (1S), the electronic device 150 may execute application 180 (block 416). The application 180 may obtain the image transmission port 122 to which the electronic device 150 is connected (block 418) and the data transmission port 112 to which the electronic device 150 is connected (block 420). Then, in the first step (1S), the application 180 checks display device 100 (block 422). For example, the application 180 can check the settings of relevant connection parameters between the electronic device 150 and the display device 100, but the present invention is not limited thereto. In some embodiments, if the application 180 detects an error in the connection with the display device 100, the application 180 may re-confirm the data transmission port to which the electronic device 150 is connected.

In the second step (2S), the microcontroller 102 of the display device 100 performs the delay action (block 406). In the second step (2S), the application 180 executed by the electronic device 150 initializes the display device 100 (block 424). In the third step (3S), the microcontroller 102 of the display device 100 performs the delay action (block 408). In the third step (3S), the application 180 executed by the electronic device 150 obtains the information from the microcontroller 102 (block 426). For example, the application 180 obtains the information of the pairing table in the microcontroller 102. In the fourth step (4S), the microcontroller 102 of the display device 100 performs the delay action (block 410). In the fourth step (4S), the application 180 executed by the electronic device 150 updates the KVM pairing table and records (or stores) the information that "the data transmission port 112 corresponds to the image transmission port 122" in the KVM pairing table (block 428).

In the fifth step (5S), the microcontroller 102 of the display device 100 reads the KVM pairing table (block 412). In some embodiments, the KVM pairing table has been updated by the application 180 executed by the electronic device 150. In the sixth step (6S), the microcontroller 102 of the display device 100 switches image transmission ports according to the KVM pairing table (block 414). That is, the microcontroller 102 switches from image transmission port 120 to image transmission port 122, so that the control rights of the keyboard and mouse in the peripheral device 160 and the image displayed by the display module 104 in the display device 100 are switched to the electronic device 150. The time units of the steps in FIG. 3 (for example, the interval between each step is 1 second) are only examples, expressing the approximate sequence of corresponding actions performed between the display device 100 and the electronic device 150, and are not intended to limit the present invention.

In some embodiments, the display device 100 initially displays the image from the electronic device 150, and the peripheral device 160 is initially connected to the electronic device 150 through the peripheral connection port 130 and the data transmission port 112. After the process of the present invention is started, when the button 190 (for example, a KVM button) is pressed, the microcontroller 102 of the display device 100 may check the pressing period of the button 190. In some embodiments, when the pressing period of the button 190 is longer than or equal to 3 seconds, the microcontroller 102 of the display device 100 may read the data-transmission-port status of the electronic device 150. That is, the microcontroller 102 can know that the data transmission port that is currently connected is data transmission port 112. Then, the microcontroller 102 switches data transmission ports. That is, the microcontroller 102 switches from data transmission port 112 to data transmission port 110. Afterwards, the microcontroller 102 may delay for 3 seconds to wait for its internal pairing table to be updated by the application 170 of the electronic device 140.

In some embodiments, when the pressing period of button 190 is less than 3 seconds, the microcontroller 102 may switch according to the current KVM pairing table. For example, if the current pairing table has recorded the information that "the data transmission port 112 corresponds to image transmission port 122" and "the data transmission port 110 corresponds to the image transmission port 120", the microcontroller 102 switches from data transmission port 112 to data transmission port 110 and switches from image transmission port 122 to image transmission port 120. If the current pairing table has recorded the information that "data transmission port 112 corresponds to image transmission port 122" and "the data transmission port A (not shown) corresponds to the image transmission port B (not shown)", the microcontroller 102 switches from data transmission port 112 to data transmission port A, and switches from image transmission port 122 to image transmission port B.

In some embodiments, if the user presses the button 190, the present invention can update the KVM pairing table according to different setting modes, or can directly switch according to the current KVM pairing table without updating the KVM pairing table.

Figure 4:
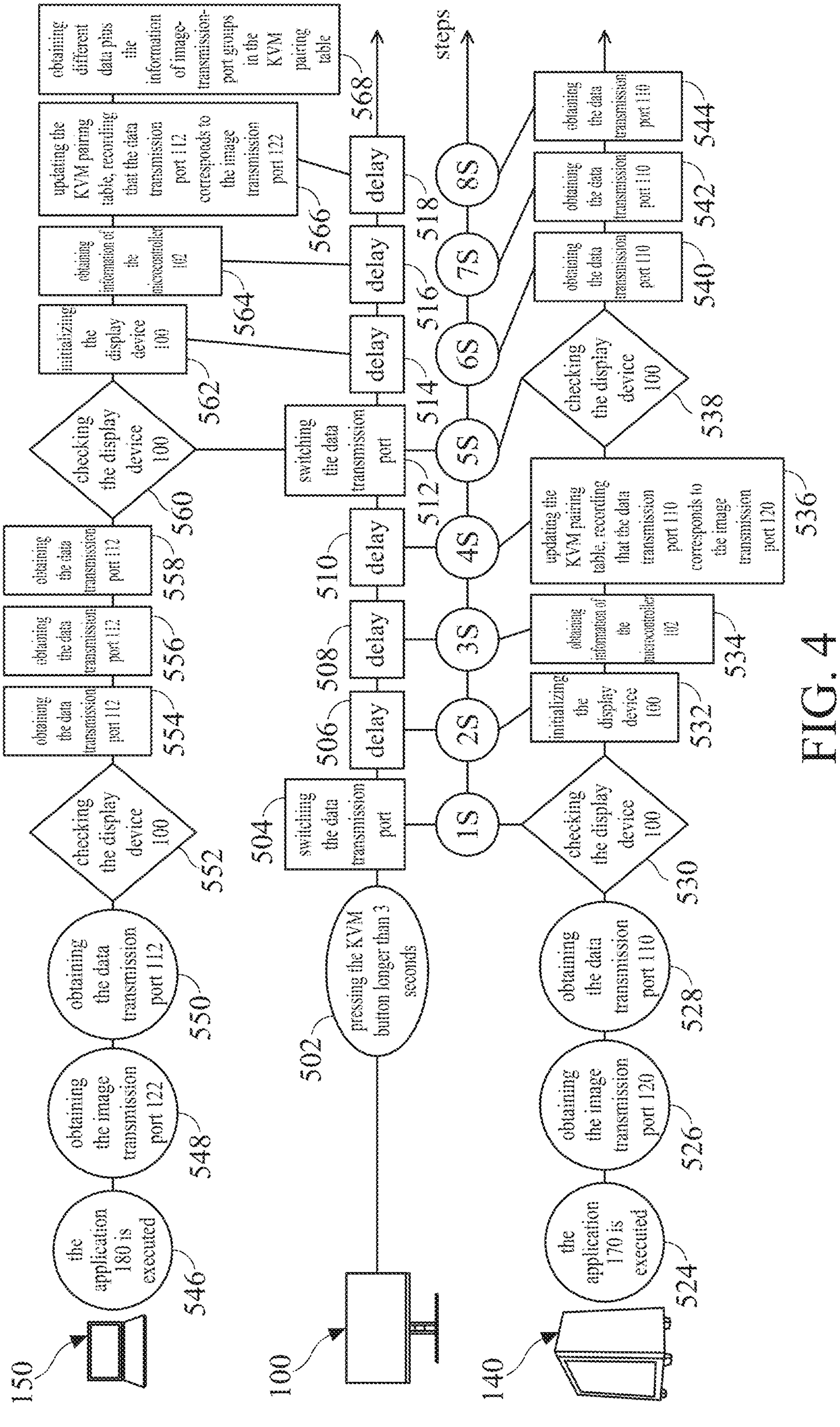
FIG. 4 shows an operation sequence diagram of the display device 100, the electronic device 140 and the electronic device 150 in FIG. 1 in the first scenario in accordance with some embodiments of the present invention.

FIG. 4 shows an operation sequence diagram of the display device 100, the electronic device 140 and the electronic device 150 in FIG. 1 in the first scenario in accordance with some embodiments of the present invention. In some embodiments of FIG. 4, the display device 100 initially displays the image from the electronic device 150, and the peripheral device 160 is initially connected to the electronic device 150 through the peripheral connection port 130 and the data transmission port 112. In other words, in the first scenario, the display device 100 initially displays the image from the electronic device 150 (for example, a laptop), and the peripheral device 160 is connected to the electronic device 150. As shown in FIG. 4, when the button 190 (for example, a KVM button) is pressed (block 502), in the first step (1S), the microcontroller 102 of the display device 100 switches data transmission ports (block 504). That is, the microcontroller 102 switches from data transmission port 112 to data transmission port 110. Before the first step (1S), the electronic device 140 may execute the application 170 (block 524). The application 170 may obtain the image transmission port 120 to which the electronic device 140 is connected (block 526) and the data transmission port 110 to which the electronic device 140 is connected (block 528). Then, in the first step (1S), the application 170 checks the display device 100 (block 530). For example, the application 170 may check the settings of relevant connection parameters between the electronic device 140 and the display device 100, but the present invention is not limited thereto. Before the first step (1S), the electronic device 150 may execute the application 180 (block 546). The application 180 may obtain the image transmission port 122 to which the electronic device 150 is connected (block 548) and the data transmission port 112 to which the electronic device 150 is connected (block 550). Then, in the first step (1S), the application 180 may check the display device 100 (block 552). For example, the application 180 can check the settings of relevant connection parameters between the electronic device 150 and the display device 100, but the present invention is not limited thereto.

In the second step (2S), the microcontroller 102 of the display device 100 performs a delay action (block 506). In the second step (2S), the application 170 executed by the electronic device 140 initializes the display device 100 (block 532). In the second step (2S), the application 180 executed by the electronic device 150 repeatedly obtains the data transmission port 112 (block 554). In the third step (3S), the microcontroller 102 of the display device 100 performs a delay action (block 508). In the third step (3S), the application 170 executed by the electronic device 140 obtains the information of the microcontroller 102 (block 534). For example, the application 170 obtains the information of the pairing table in the microcontroller 102. In the third step (3S), the application 180 executed by the electronic device 150 repeatedly obtains the data transmission port 112 (block 556). In the fourth step (4S), the microcontroller 102 of the display device 100 performs a delay action (block 510). In the fourth step (4S), the application 170 executed by the electronic device 140 updates the KVM pairing table and records (or stores) the information that "the data transmission port 110 corresponds to the image transmission port 120" in the KVM pairing table (block 536). In the fourth step (4S), the application 180 executed by the electronic device 150 repeatedly obtains the data transmission port 112 (block 558).

In the fifth step (5S), the microcontroller 102 of the display device 100 switches data transmission ports again (block 512). For example, the microcontroller 102 switches from data transmission port 110 back to data transmission port 112. In the fifth step (5S), the application 170 executed by the electronic device 140 checks the display device 100 (block 538). For example, the application 170 may check the settings of relevant connection parameters between the electronic device 140 and the display device 100, but the present invention is not limited thereto. In the fifth step (5S), the application 180 executed by the electronic device 150 checks the display device 100 (block 560). For example, the application 180 may check the settings of relevant connection parameters between the electronic device 150 and the display device 100, but the present invention is not limited thereto. In the sixth step (6S), the microcontroller 102 of the display device 100 performs a delay action (block 514). In the sixth step (6S), the application 170 executed by the electronic device 140 repeatedly obtains the data transmission port 110 (block 540). In the sixth step (6S), the application program 180 executed by the electronic device 150 initializes the display device 100 (block 562).

In the seventh step (7S), the microcontroller 102 of the display device 100 performs a delay action (block 516). In the seventh step (7S), the application 170 executed by the electronic device 140 repeatedly obtains the data transmission port 110 (block 542). In the seventh step (7S), the application 180 executed by the electronic device 150 obtains the information of the microcontroller 102 (block 564). For example, the application 180 obtains the information of the pairing table in the microcontroller 102. In the eighth step (8S), the microcontroller 102 of the display device 100 performs a delay action (block 518). In the eighth step (8S), the application 170 executed by the electronic device 140 repeatedly obtains the data transmission port 110 (block 544). In the eighth step (8S), the application 180 executed by the electronic device 150 updates the KVM pairing table and records (or stores) the information that "the data transmission port 112 corresponds to the image transmission port 122" in the KVM pairing table (block 566).

After the eighth step (8S), the application 180 executed by the electronic device 150 obtains different data plus the information of image-transmission-port groups in the KVM pairing table (block 568). After the eighth step (8S), the microprocessor 102 confirms that the connection port has been updated, and switches from image transmission port

120 back to image transmission port 122 according to the KVM pairing table, so that the control rights of the keyboard and mouse in the peripheral device 160 and the image displayed by the display module 104 in the display device 100 are switched to the electronic device 150. The time units of the steps in FIG. 4 (for example, each action interval is 1 second) is only an example, expressing the approximate sequence of performing corresponding actions between the display device 100, the electronic device 140, and the electronic device 150, and are not intended to limit the present invention.

Figure 5:
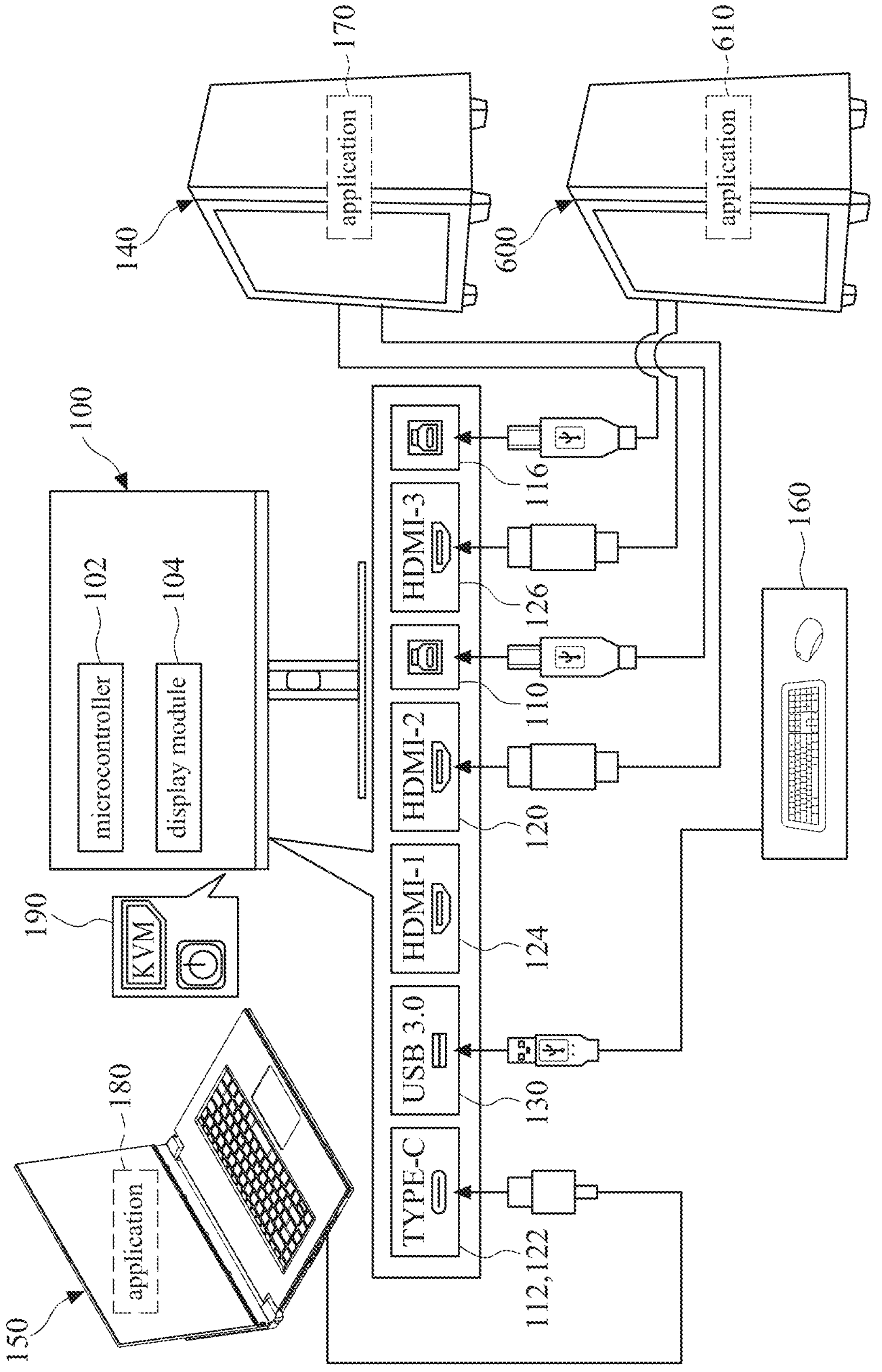
FIG. 5 shows a configuration diagram of the display device 100, the electronic device 140, the electronic device 150, and an electronic device 600 in accordance with some embodiments of the present invention.

FIG. 5 shows a configuration diagram of the display device 100, the electronic device 140, the electronic device 150, and an electronic device 600 in accordance with some embodiments of the present invention. As shown in FIG. 5, the display device 100 includes the microcontroller 102, the display module 104, the data transmission port 110, the data transmission port 112, a data transmission port 116, the image transmission port 120, the image transmission port 122, the image transmission port 124, an image transmission port 126, the peripheral connection port 130, and the button 190. In some embodiments, the data transmission port 110 is coupled to the electronic device 140. The data transmission port 112 is coupled to the electronic device 150. The data transmission port 116 is coupled to an electronic device 600. The image transmission port 120 is coupled to the electronic device 140. The image transmission port 122 is coupled to the electronic device 150. The image transmission port 126 is coupled to the electronic device 600. Inside the display device 100, the peripheral connection port 130 is electrically connected to the data transmission port 110 or the data transmission port 112 or the data transmission port 116. Outside the display device 100, the peripheral connection port 130 is coupled to the peripheral device 160.

In some embodiments, the data transmission port 110 may be, for example, a Type-B USB. In some embodiments, the image transmission port 126 may be, for example, HDMI marked as HDMI-3 in the display device 100, but the present invention is not limited thereto. In some embodiments, the electronic device 600 may be, for example, a desktop computer, but the present invention is not limited thereto. When the button 190 is pressed, if the microcontroller 102 selects the image transmission port 122 (that is, the display module 104 initially displays the image from the electronic device 150), the microcontroller 102 switches from data transmission port 112 to either data transmission port 110 or data transmission port 116, and receives the image-transmission-port information stored in the electronic device 140 through data transmission port 110, or it receives the image-transmission-port information stored in the electronic device 600 through the data transmission port 116.

In detail, when the button 190 is pressed for the first time, if the microcontroller 102 selects the image transmission port 122 (that is, the display module 104 initially displays the image from the electronic device 150), the microcontroller 102 switches from data transmission port 112 to data transmission port 110, and receives the image-transmission-port information stored in the electronic device 140 through data transmission port 110. When the button 190 is pressed for the second time, if the microcontroller 102 selects the image transmission port 122 (that is, the display module 104 initially displays the image from the electronic device 150), the microcontroller 102 switches from data transmission port 112 to data transmission port 116, and receives the image-transmission-port information stored in the electronic device 600 through data transmission port 116.

In some embodiments, the image-transmission-port information of the electronic device 600 corresponds to the image transmission port 126, that is, the image-transmission-port information of the electronic device 600 records that the data transmission port 116 corresponds to the image transmission port 126, and is stored in the pairing table of the microcontroller 102. In some embodiments, the electronic device 600 executes an application 610. The actions performed by the application 610 of the electronic device 600 are the same as the actions performed by the application 170 of the electronic device 140 and the actions performed by the application 180 of the electronic device 150, and therefore will not be described again.

In the display device 100 of the present invention, the display device 100 originally displays the image of the electronic device 150 (such as a laptop). When the button 190 is pressed, the display device 100 directly updates the connection status of the electronic device 140 (such as a desktop computer), and then directly displays the image of the electronic device 140 (such as a desktop computer). In some embodiments, the display device 100 originally displays the image of the electronic device 150 (such as a laptop). When the button 190 is pressed, the display device 100 directly updates the connection status of the electronic device 140 (such as a desktop computer) and then switches back to display the image of the electronic device 150 (such as a laptop).

In some embodiments, when the button 190 is pressed for a period longer than or equal to a preset period, the display device 100 directly updates the connection status of the electronic device 140 (such as a desktop computer), and then displays the image of the electronic device 140 (such as a desktop computer) or the electronic device 150 (such as a laptop). When the button 190 is pressed for a period shorter than the preset period, the display device 100 directly switches the images of the electronic device 140 (such as a desktop computer) and the electronic device 150 (such as a notebook computer) in turn. The display device 100 of the present invention does not require the user to manually set the image input source to be bound to the Type-B USB or the upstream USB. The present invention can automatically complete settings through the application program 170 in the electronic device 140 and the application program 180 in the electronic device 150.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:

a button;

a first data transmission port, configured to be coupled to a first electronic device;

a second data transmission port, configured to be coupled to a second electronic device;

a first image transmission port, configured to be coupled to the first electronic device;

a second image transmission port, configured to be coupled to the second electronic device;

a microcontroller, configured to select the first image transmission port, the second image transmission port, or both to generate a video signal; and a display module, configured to present an image according to the video signal, wherein when the button is pressed, if the microcontroller selects the first image transmission port, the microcontroller switches from the first data transmission port to the second data transmission port, and receives image-transmission-port information stored in the second electronic device through the second data transmission port.

2. The display device as claimed in claim 1, wherein the image-transmission-port information corresponds to the second image transmission port, records that the second data transmission port corresponds to the second image transmission port, and is stored in a pairing table of the microcontroller; wherein the microcontroller selects the second image transmission port.

3. The display device as claimed in claim 1, wherein the image-transmission-port information corresponds to the second image transmission port, records that the second data transmission port corresponds to the second image transmission port, and is stored in a pairing table of the microcontroller; wherein the microcontroller switches the second data transmission port to the first data transmission port.

4. The display device as claimed in claim 1, further comprising:

a peripheral connection port, configured to be electrically connected to the first data transmission port or the second data transmission port.

5. The display device as claimed in claim 1, wherein a first application installed on the first electronic device stores the image-transmission-port information from the first electronic device; and a second application installed on the second electronic device stores the image-transmission-port information from the second electronic device.

6. The display device as claimed in claim 1, wherein when the button is pressed for a period longer than or equal to a preset period, the image-transmission-port information corresponds to the second image transmission port, records that the second data transmission port corresponds to the second image transmission port, and is stored in a pairing table of the microcontroller; wherein the microcontroller switches the second data transmission port to the first data transmission port.

7. The display device as claimed in claim 6, wherein the preset period is 3 seconds.

8. The display device as claimed in claim 1, wherein the first data transmission port and the first image transmission port are coupled to the first electronic device through the same transmission line.

9. The display device as claimed in claim 6, wherein when the button is pressed for a period shorter than the preset period, the microcontroller switches the first data transmission port to the second data transmission port and switches the first image transmission port to the second image transmission port according to the pairing table and the first image transmission port which is currently selected.

10. The display device as claimed in claim 6, wherein when the pairing table has recorded that the first data transmission port corresponds to the first image transmission port and the button is pressed for a period shorter than the preset period, the microcontroller switches the second data transmission port to the first data transmission port and switches the second image transmission port to the first image transmission port according to the pairing table and the second image transmission port which is currently selected.

* * * * *